United States Patent
Heil

(10) Patent No.: US 9,206,572 B2
(45) Date of Patent: Dec. 8, 2015

(54) TRAVELING SCREEN MACHINE

(71) Applicant: Klau Heil, Schweigen-Rechtenbach (DE)

(72) Inventor: Klau Heil, Schweigen-Rechtenbach (DE)

(73) Assignee: BILFINGER WATER TECHNOLOGIES GMBH, Aarbergen (DE)

( * ) Notice: Subject to any disclaimer, the term of this patent is extended or adjusted under 35 U.S.C. 154(b) by 56 days.

(21) Appl. No.: 13/649,362

(22) Filed: Oct. 11, 2012

(65) Prior Publication Data

US 2013/0032548 A1 Feb. 7, 2013

Related U.S. Application Data

(63) Continuation of application No. PCT/EP2011/001557, filed on Mar. 29, 2011.

(51) Int. Cl.
*B01D 33/00* (2006.01)
*B01D 33/29* (2006.01)
*E02B 8/02* (2006.01)
*B01D 33/333* (2006.01)

(52) U.S. Cl.
CPC .............. *E02B 8/026* (2013.01); *B01D 33/333* (2013.01); *B01D 2201/313* (2013.01); *B01D 2201/60* (2013.01)

(58) Field of Classification Search
None
See application file for complete search history.

(56) References Cited

U.S. PATENT DOCUMENTS

| | | | | | |
|---|---|---|---|---|---|
| 1,411,945 | A | * | 4/1922 | Wallene | 210/122 |
| 1,606,546 | A | * | 11/1926 | Wallene | 210/160 |
| 1,799,299 | A | * | 4/1931 | Johnston | 210/400 |
| 1,864,359 | A | * | 6/1932 | Laughlin et al. | 210/160 |
| 2,095,504 | A | * | 10/1937 | Kesti et al. | 210/160 |
| 4,892,652 | A | | 1/1990 | Rudy et al. | |
| 6,719,898 | B1 | | 4/2004 | Marzluf | |
| 7,326,335 | B2 | * | 2/2008 | Chuang | 210/155 |
| 7,722,762 | B2 | * | 5/2010 | Zubair | 210/160 |
| 8,092,674 | B2 | * | 1/2012 | Heil | 210/158 |
| 2007/0095730 | A1 | * | 5/2007 | Chuang | 210/155 |
| 2011/0139692 | A1 | * | 6/2011 | Heil | 210/158 |
| 2013/0032548 | A1 | * | 2/2013 | Heil | 210/767 |

FOREIGN PATENT DOCUMENTS

| | | |
|---|---|---|
| DE | 19654132 A1 | 3/1998 |
| DE | 19935321 A1 | 2/2001 |
| JP | 2002294666 A | 10/2002 |

OTHER PUBLICATIONS

International Search Report and Written Opinion dated Sep. 2, 2011 issued in related International Application PCT/EP2011/001557 (in German—no English abstract available).
Preliminary Report on Patentability dated Jul. 10, 2012 issued in related International Application PCT/EP2011/001557 (in German—no English abstract available).

(Continued)

*Primary Examiner* — Robert James Popovics
(74) *Attorney, Agent, or Firm* — Carter, DeLuca, Farrell & Schmidt, LLP; Robert P. Michal, Esq.

(57) ABSTRACT

A traveling screen machine having an active screen section arranged transverse to the flow direction of a liquid stream is suggested, wherein the endless screen belt is formed as an endless screen belt that is flexibly foldable, compressible or bendable transverse to its direction of movement.

13 Claims, 5 Drawing Sheets

(56) References Cited

OTHER PUBLICATIONS

English translation of PCT Preliminary Report on Patentability issued in related International Application PCT/EP2011/001557 (7 pages).

English translation of DE19654132A1, published Feb. 1, 2001 (8 pages).

English translation of JP2002294666A, published Oct. 9, 2002 (34 pages).

* cited by examiner

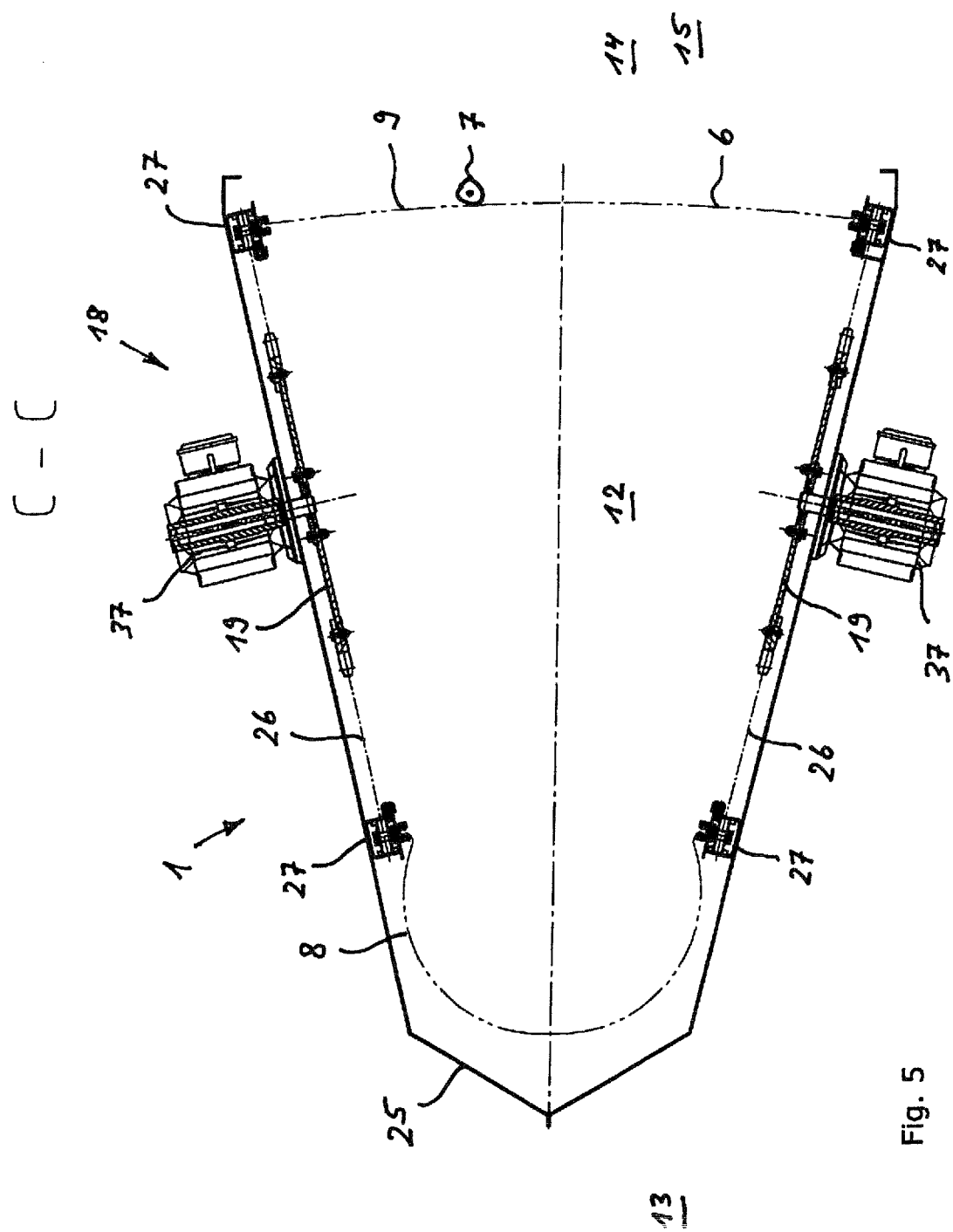

TRAVELING SCREEN MACHINE

CROSS-REFERENCE TO RELATED APPLICATIONS

This is a Continuation application under 37 CFR 1.53(b), of pending PCT International Application Serial No PCT/EP2011/001557, filed Mar. 29, 2011, which claims the benefit of German Application Serial No. DE 10 2010 019 133.7 filed Apr. 30, 2010, the entire contents of each of which is incorporated herein by reference.

The invention relates to a traveling screen machine for mechanically separating and extracting solid components, solid bodies or solid matter from a liquid stream flowing in a sluice channel, in particular a screen or filter rake for process, cooling or effluent streams or for sewage treatment plants or hydroelectric power plants or for use in a water carrying-channel of a cooling water intake structure of a power plant, comprising an endless screen belt immersing into the liquid stream and rotating in a direction of movement, forming a screen area in the sluice channel in an active screen section of the endless screen belt arranged in the liquid stream, wherein the active screen section of the endless screen belt is at least approximately or essentially aligned transverse to the flow direction of the liquid stream in the sluice channel, and comprising a drive apparatus for driving the endless screen belt in its direction of movement. Furthermore, the invention is directed to a corresponding method for mechanically separating and extracting solid components, solid bodies or solid matter from a liquid stream flowing in a sluice channel by means of a traveling screen machine.

Traveling screen machines are usually provided with a number of screen panels, successive and juxtaposed in the direction of movement of the endless screen belt, usually concatenated with each other and forming a rotating endless screen belt immersing into the liquid stream, and also having a drive means for the endless screen belt, wherein separating and extracting solid matter from the liquid stream can preferably be carried out in a continuous manner. The screen panels comprise screen inserts for separating out solid material from the liquid stream, wherein the solid matter cannot pass the traveling screen machine, as long as its dimensions are larger than the gap width or mesh size of the screen. It thus deposits on the screen panels. Various screen inserts can be used, such as fabric screens, perforated screen panels, slotted screens of individual bars, wherein the individual bars may not be round, as the case may be, but may have an optimized profile, screen gratings or any other screen materials suitable for filtration.

The rotating movement of the endless screen belt conveys the solid matter deposited on the screen panels upwards out of the liquid stream where it is discharged or removed at a discharge position above the water level. Complete screen panel cleaning can be carried out at the discharge position by means of spraying the screen panels by using water jets before the screen panels are re-immersed in the liquid stream.

Such traveling screen machines are known in diverse embodiments, which differ with respect to the flow direction through the ascending and descending sections of the endless screen belt. The options to be chosen are "through flow," "from the outside in" and "from the inside out." To adopt the "through flow" design option the screen panels are arranged transverse to the flow direction of the sluice channel, and the descending screen panels (moving toward the bottom) are arranged downstream from the ascending screen panels (moving toward the top).

A traveling screen machine of the "through flow" design according to the prior art comprises an endless screen belt formed by rectangular screen panels, which are connected with each other in an articulated manner. The individual screen panels can be pivoted with respect to each other about a horizontal axis. The endless screen belt is immersed in the liquid stream resulting in an upstream section and a downstream section of the endless screen through which the liquid stream flows. The upstream section and the downstream section of the endless screen belt are connected via top and bottom redirecting means, wherein a spraying means for the screen panels is usually provided at the top redirecting means.

In the through flow design type, the endless screen belt usually covers the entire cross section of the liquid stream so that the solid matter cannot pass through the screen apparatus, as long as its dimensions are larger than the gap width or the mesh size of the screen panels. It thus deposits on the screen panels.

With through flow traveling screen machines according to the prior art, debris is deposited on the outside of the screen belt and thus, after it has been extracted by means of the screen belt, it is sprayed off the screen belt from the inside out by means of a cleaning apparatus acting on the inside of the screen belt. The spray nozzles are thus arranged between the ascending and the descending sections of the screen belt, i.e., "inside," and spray the debris to the "outside."

A drawback with this prior art according to the through flow embodiment is that the desired cleaning effect of the liquid stream is essentially already achieved by the liquid flowing through the upstream section of the endless screen belt. However, the liquid stream still has to pass through the downstream section of the endless screen belt thus doubling the pressure loss, invariably arising as a result of the liquid flowing through the endless screen belt. With through flow traveling screen machines, only the upstream, ascending screen panels contribute to the screening process. The downstream, descending screen panels do not contribute to the screening effect since they are downstream from the ascending screen panels. However, the liquid stream still has to flow through two successive sections of screen panels, which causes a higher pressure loss in the liquid stream.

This pressure loss usually results in an undesirable decrease in the liquid level, which sometimes has to be raised again by using pumps and the like. The drawback of such a pressure loss applies both to sewage water plants, where compensation is provided by pumps or other means, and for cooling water systems, which are a preferred field of application of the present invention. In cooling water systems, large main cooling water pumps are present for the entire amount of water. The additional pressure loss corresponds to a lower water level in the pump chamber which has to be additionally overcome by the cooling water pumps. This leads to a substantial increase in energy expenditure and thus operating cost. The required structural length can be a drawback, in particular for cost reasons.

To solve this problem, German application DE 19654132 A1 of the present applicant, suggest providing a screen apparatus of the "through flow embodiment" with screen panels that can fold out in the downstream section of the endless screen belt so that the flow through cross section is largely unobstructed in the open position. Structural measures for redirecting the liquid stream can thus be dispensed with. The screen panels are essentially flown through only once so that the overall pressure loss remains advantageously low. However, this adds to the complexity of the structure of the endless screen belt, and substantial effort is required to ensure that the closed screen panels in the front, upstream section of the endless screen belt are leak-proof.

A comparable screen apparatus of the "through flow" design type is known from JP 2002-294666. It comprises screen panels with screen panel frames, on which screen nets are held taut and which are each guided on both sides with two chains arranged one behind the other. The distance between the two chains changes along the peripheral path of the endless screen belt. In the upstream, front section of the screen belt, the distance between the chains is small and the juxtaposed screen panels form a common, closed screen area in the stream. In the downstream, rear section of the endless screen belt, the distance between the chains is large, resulting in the screen panels being pivoted into an open position, thus forming an unobstructed flow-through cross section between neighboring screen panels, through which the liquid can flow past the pivoted screen panels. As before, structural measures for redirecting the liquid stream can be dispensed with, and the liquid still essentially flows through the screen panels only once so that the overall pressure loss is advantageously low. However, the structure of the endless screen belt is complicated, and a substantial effort is required to ensure that the closed screen panels in the front, upstream section of the endless screen belt are leak-proof.

Furthermore, the prior art through flow embodiments have the drawback that the screen panels rotating from the dirty water side to the clean water side transfer a part of the debris load remaining adhered to them from the dirty water side to the clean water side which leads to a contamination of the clean water side. This is prevented in the "from the inside out" and "from the outside in" embodiments.

In the prior art screen apparatus of the "from the outside in" and "from the inside out" design types, the pressure loss, unavoidable if a cleaning effect is to be achieved, can be restricted to that resulting from the liquid flowing through only one screen panel by dividing the liquid stream by structural means and redirecting the approximate half flows by about 90° to the left and right, respectively. In the "from the outside in" and "from the inside out" design variants, the screen panels are arranged along the flow direction of the sluice channel. In this case, the endless screen belt is immersed in the liquid stream in such a manner that the screen panels are aligned along the original flow direction of the liquid stream. One half of the divided liquid stream will then be directed to the left through the left section of the endless screen belt, and the other half of the liquid stream will be directed to the right through the right section of the endless screen belt. After flowing through the endless screen belt, the two halves of the liquid stream will be redirected and brought together again.

With this approach, the liquid stream can be directed from the inside of the endless screen belt, through the same and to the outside, or the reverse. This is why these embodiments are also referred to as "from the inside out" or "from the outside in." With the "from the outside in" design option, the dirty water side is the outside of the sections moving up or down, and the clean water side is the inside between the two sections. With the "from the inside out" design option it is the reverse. While it is advantageous that the liquid flows through the endless screen belt only once and the pressure loss is advantageously low, the structural measures to be taken are disadvantageously complex and expensive. Moreover, substantial flow turbulence is caused by the flow redirection, which leads to a reduction in throughput or to an increased size of the apparatus, for example, due to the need of a greater distance to a downstream pump, which should be installed in a largely turbulent-free zone. Moreover, the two-fold redirection of the liquid stream leads to an excessive structural length in the direction of the overall flow direction, which is often not available or only available if substantial increases in cost are accepted.

The "through flow" design options according to the prior art have the drawback that debris accumulates on the bottom of the channel due to sedimentation processes in the area between the screen arrays, which can have a disadvantageous effect on the movement of the screen panels in the course of time.

As a point of departure, the invention takes the "through flow" design option, i.e. a traveling screen machine, where the active screen section of the endless screen belt is at least approximately or essentially aligned transverse to the flow direction of the liquid stream in the sluice channel. Based on this prior art, it is the object of the present invention to provide a traveling screen machine of the initially mentioned type which combines the lowest possible pressure loss in the liquid stream with the smallest possible structural length of the apparatus as seen in the flow direction, and a simple structure of the endless screen belt, which avoids "carryover" of debris from the dirty water side to the clean water side, reduces permanent sedimentation on the bottom of the channel and enables convenient debris separation from the endless screen belt.

The object is achieved according to the present invention by a traveling screen machine with the features of the appended independent claims. Preferred embodiments and further developments of the invention can be derived from the dependent claims and the subsequent description with the associated drawings.

A traveling screen machine according to the present invention for mechanically separating and extracting solid components, solid bodies or solid matter from a liquid stream flowing in a sluice channel, in particular a screen or filter rake for process, cooling or effluent streams, or for sewage treatment plants or hydroelectric power plants, or for use in a water-carrying channel of a cooling water intake structure of a power plant, comprising an endless screen belt immersing into the liquid stream and rotating in a direction of movement, forming a screen area in the sluice channel in an active screen section of the endless screen belt arranged in the liquid stream, wherein the active screen section of the endless screen belt is at least approximately or essentially aligned transverse to the flow direction of the liquid stream in the sluice channel, and comprising a drive apparatus for driving the endless screen belt in its direction of movement, thus comprises the special feature that the endless screen belt is formed as an endless screen belt flexibly foldable, compressible or bendable transverse to its direction of movement, which is spread out in the active screen section arranged in the liquid stream, and is in a folded, compressed or bent state transverse to its direction of movement in a compression section arranged upstream in the liquid stream with respect to the active screen section.

A method according to the present invention for mechanically separating and extracting solid components, solid bodies or solid matter from a liquid stream flowing in a sluice channel, with a traveling screen machine, in particular a screen or filter rake for process, cooling or effluent streams, or for sewage treatment plants or hydroelectric power plants, or for use in a water-carrying channel of a cooling water intake structure of a power plant, comprising an endless screen belt immersing into the liquid stream and rotating in a direction of movement, forming a screen area in the sluice channel in an active screen section of the endless screen belt arranged in the liquid stream, wherein the active section of the endless screen belt is at least approximately or essentially aligned transverse to the flow direction of the liquid stream in the sluice channel, and comprising a drive apparatus for driving the endless screen belt in its direction of movement, comprises the special feature that an endless screen belt is used that is an endless screen belt flexibly foldable, compressible or bendable transverse to its direction of movement, the endless screen belt is spread out in the active screen section arranged in the liquid stream, and is folded, compressed or bent transverse to its direction of movement in a compression section arranged upstream in the liquid stream with respect to the active screen section.

The endless screen belt, as it rotates, can thus be folded, compressed or bent transverse to the flow direction of the liquid stream, wherein its edges extending on the left and right can approach each other thus resulting in a reduction of the transverse extension of the endless screen belt transverse to its direction of movement and transverse to the flow direction. In the context of the present invention, it has emerged that this feature can be advantageously used in order to benefit from the advantages of traveling screen machines of the "from the outside in", or "from the inside out" design types, also in the "through flow" design option, without having to accept its drawbacks.

The invention will be described in the following with reference to exemplary embodiments shown in the figures in more detail. The features shown here can be used alone or in combination to create preferred embodiments of the invention.

FIG. 5 is a horizontal sectional view along line C-C of FIG. 1.

Figure 1:
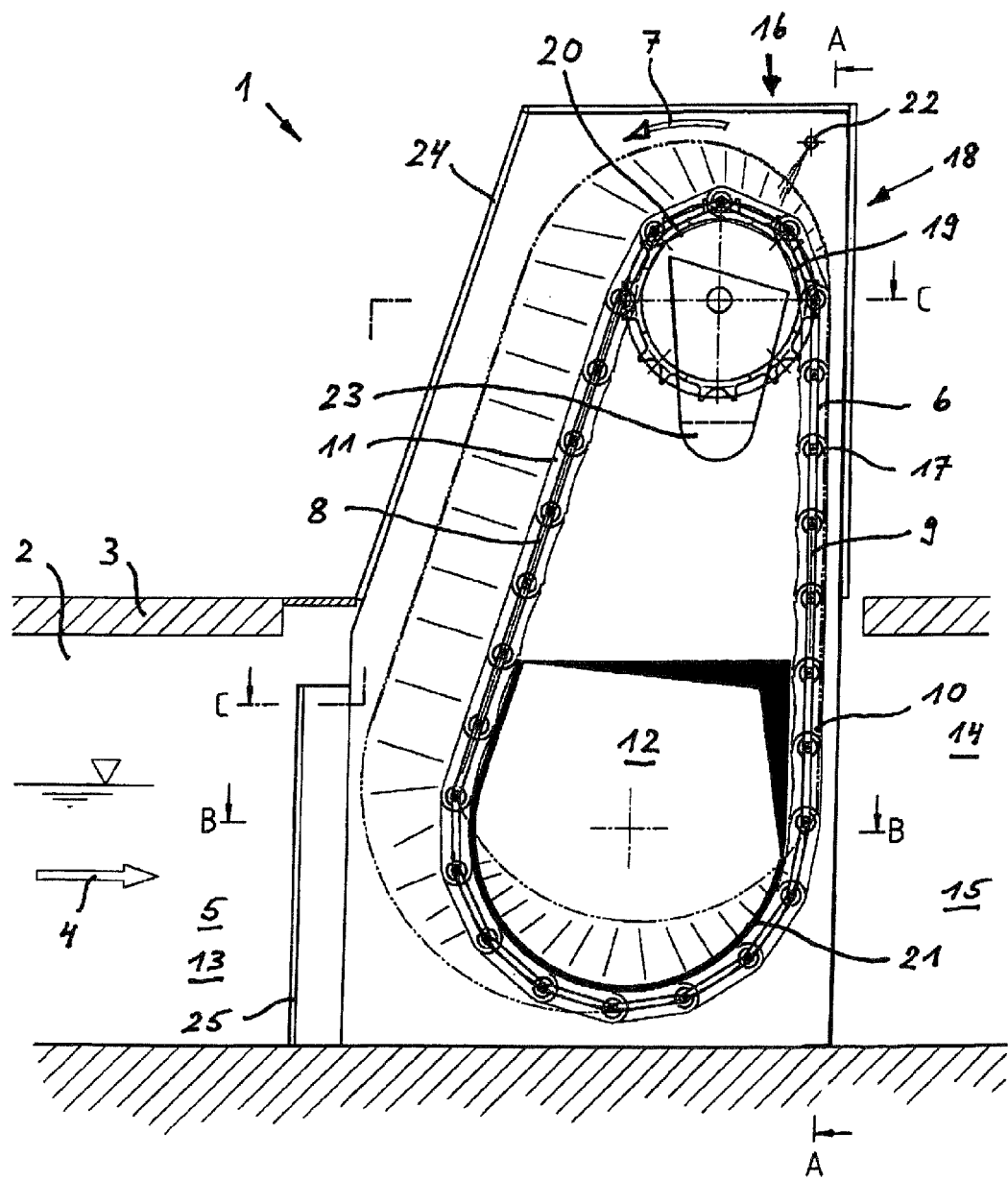
FIG. 1 is a side view of a traveling screen machine according to the present invention.

FIG. 1, in a side view, shows a traveling screen machine 1 for mechanically separating and extracting solid components, solid bodies or solid matter from a liquid stream flowing in a sluice channel. Such a traveling screen machine 1 is, for example, a screen or filter rake for process, cooling or effluent streams, or for sewage treatment plants or hydroelectric power plants, or for use in a water-carrying channel 2 of a cooling water intake structure 3 of a power plant, a petrochemical or seawater desalination plant, a steel works or other industrial facility. As a last cleaning stage in the water intake, screening is of particular importance, since downstream systems, such as pumps and condensers, have to be reliably protected against disturbances caused by solid components contained in the water, which separated out by the traveling screen machine 1.

Such traveling screen machines 1 facilitate a high water throughput of typically up to 100,000 m³/h while having an extremely compact structural volume. Typical parameters are: a machine length of 1.0-4.5 m (in the flow direction 4), a channel width of 2.5-7.0 m (transverse to the flow direction 4), a chamber depth of up to 20 m, a structural height above the floor line of 1.6-2.2 m and a mesh size of the screen of 0.2-10 mm.

In the side view of FIG. 1, the traveling screen machine 1 according to the invention is similar to a traveling screen machine of the "through flow" design type according to the prior art, however, instead of a plurality of screen panels forming a rotating endless screen belt 6 immersing into the liquid stream 5, wherein a plurality of juxtaposed screen panels succeeding each other in the direction of movement 7 of the endless screen belt 6 form a common screen area in the channel 2 or the liquid stream 5 both in the descending section 8 of the endless screen belt 6 and in the ascending section 9 of the endless screen belt 6, it comprises an endless screen belt 6 that is flexibly foldable, compressible or bendable transverse to its direction of movement, which is spread out in the active screen section 10 arranged in the liquid stream 5, and is in a folded, compressed or bent state transverse to its direction of movement 7 in a compression section with respect to the active screen section.

An active screen section 10 of the endless screen belt 6 is to be understood as a section of the endless screen belt 6 which is immersed in the liquid stream 5 and through which the liquid stream 5 flows, such that it contributes to the filtering effect of the traveling screen machine 1. The active screen section 10 is thus part of the downstream section of the endless screen belt 6. In contrast, the compression section 11 of the endless screen belt is preferably essentially not active as a screen, i.e. the liquid stream 5 does not, or only to a very small percentage, flow through it, and it does not, or only very slightly, contribute to the filtering effect of the traveling screen machine 1. The screening effect is thus essentially or completely achieved by the active screen section 10. This will be explained below with reference to FIG. 2.

The direction of movement 7 of the active screen section 10 can basically be upwards or downwards. The embodiment shown in FIG. 1 is preferred, in which the direction of movement of the active screen section 10 is upwards, i.e. out of the liquid stream 5, and the one of the compression section 11 is downwards, i.e. into the liquid stream 5. In this way the debris filtered out by the endless screen belt 6 from the liquid stream 5 in the active screen section 10 is conveyed upwards without the endless screen belt 6 being folded, compressed or bent transverse to its direction of movement, and without debris falling off or the endless screen belt 6 being damaged. For this purpose, advantageously, the guidance of the endless screen belt 6 is configured in its downstream, ascending section 9 in such a manner that the endless screen belt 6 is moved in this area without it being folded, compressed or bent transverse to its direction of movement 7, and is guided essentially with uniform width in this section 9.

The flow direction 4 through the active screen section 10 of the endless screen belt 6 is from the inside 12 of the endless screen belt 6 to the outside 14 of the endless screen belt 6. Correspondingly, the inside 12 of the endless screen belt 6 is the dirty water side 13, and the outside 14 of the endless screen belt 6 is the clean water side 15 of the endless screen belt 6 and the traveling screen machine 1.

The water to be cleaned flows towards the active screen section 10 on the dirty water side 13, debris accumulates on the inside of the endless screen belt 6 in the active screen section 10, and the screened or filtered water exits on the clean water side 15. The debris collected in the active screen section 10 is lifted out of the liquid stream 5 with the ascending section 9 by means of the rotating movement of the endless screen belt 6 in the direction of movement 7, and conveyed to a cleaning area 16, where it is separated from the endless screen belt 6.

To facilitate the rotating movement of the endless screen belt 6, it is connected with a tensile means or conveying means. These are usually two maintenance-free pintle chains 17, one on each outer edge of the endless screen belt 6. The chains 17 are guided in guiding means anchored on the structure 3, wherein the required leak-proofing is provided to ensure that the water flows through the active screen section 10 and not past it.

To drive the endless screen belt 6 in its direction of movement 7, a driving apparatus 18 with at least one drive motor and at least one sprocket 19 is used. The drive motor can drive one or both chains 17. By varying the speed of the endless screen belt 6, the water throughput and the cleaning of the screen belt can be optimally adjusted. Special anodes as part of a cathodic corrosion protection can be integrated for corrosion protection for the chains 17 and chain guiding means, in particular when exposed to seawater. The endless screen belt 6 is reversed in the top area by a redirecting means 20 provided by the sprocket 19. In the bottom area, the endless screen belt 6 is reversed by means of the bottom redirecting means 21 provided, for example, by a redirecting arc.

The redirecting radii of the top redirecting means 20 and the bottom redirecting means 21 can be different. As shown in FIG. 1, preferably the radius of the bottom redirecting means 21 is larger than the radius of the top redirecting means 20. The top and bottom redirecting means can be configured as circular arcs, in particular the top redirecting means 20, which is formed by one or more sprockets 19 for driving the endless screen belt 6. Redirecting arcs different from a circular arc can also be implemented.

To avoid debris accumulating on the bottom of the channel or to realize an active screen section 10 that is as large as possible, i.e. that extends as far as possible to the bottom of the channel, it can be advantageously provided that the apex of the redirecting means of the bottom, downstream section 9 of the endless screen belt 6 be arranged lower down than the apex of the redirecting means of the bottom, upstream section 8 of the endless screen belt 6. In this embodiment, the apices of the redirecting means of the bottom, downstream and upstream sections of the endless screen belt 6 are thus at different heights above the channel bottom.

With a traveling screen machine 1 according to the present invention, the debris separated out of the liquid stream 5, unlike the through flow traveling screen machine according to the prior art, where it accumulates on the outside 14 of the endless screen belt 6, accumulates on the inside 12 of the endless screen belt 6, whereupon it is consequently sprayed off from the outside to the inside by means of a cleaning apparatus acting from the outside. A traveling screen machine 1 according to the present invention thus preferably comprises a cleaning apparatus for cleaning a section of the endless screen belt 6 lifted out of the liquid stream 5 in a cleaning area 16 of the traveling screen machine 1, spray nozzles 22 or compressed air nozzles arranged on the outside 14 of the endless screen belt 6, and a debris collection trough 23 arranged on the inside 12 of the endless screen belt 6 opposite the spray nozzles 22 or compressed air nozzles, for collecting debris sprayed off the endless screen belt 6. This cleaning apparatus is preferably arranged in the area of the top redirecting means 20 of the endless screen belt 6.

The debris load adhering to the inside 12 of the ascending, downstream section 9 of the endless screen belt 6 is transported to the cleaning area 16 at the service level. Coarser pieces will fall due to mere gravitational pull into the debris collection trough 23, also referred to as a waste water collection trough. The endless screen belt 6 is thoroughly cleaned by spraying with the spray nozzles 22.

If stubborn soiling remains adhered to the endless screen belt 6 during cleaning of the endless screen belt 6, it will remain on the inside 12 of the endless screen belt 6, where it will eventually be reliably removed as it repeatedly passes the water jets in the cleaning area 16 due to the rotating movement of the endless screen belt 6. Coarser sediment, rolling matter and floating matter will also invariably be caught in the inside area 12 of the traveling screen machine 1 and removed from there. Soiling of the bottom of channel 2, and carryover effects of the debris load into the clean water side, often observed with other flow patterns, are thus eliminated.

The water jet apparatus with the spray nozzles 22 or the entire upper head of the traveling screen machine 1 are covered by a cover 24. The water jet process of the endless screen belt can be controlled from the outside. A manual or automatic spray nozzle cleaning apparatus can be provided.

Figure 2:
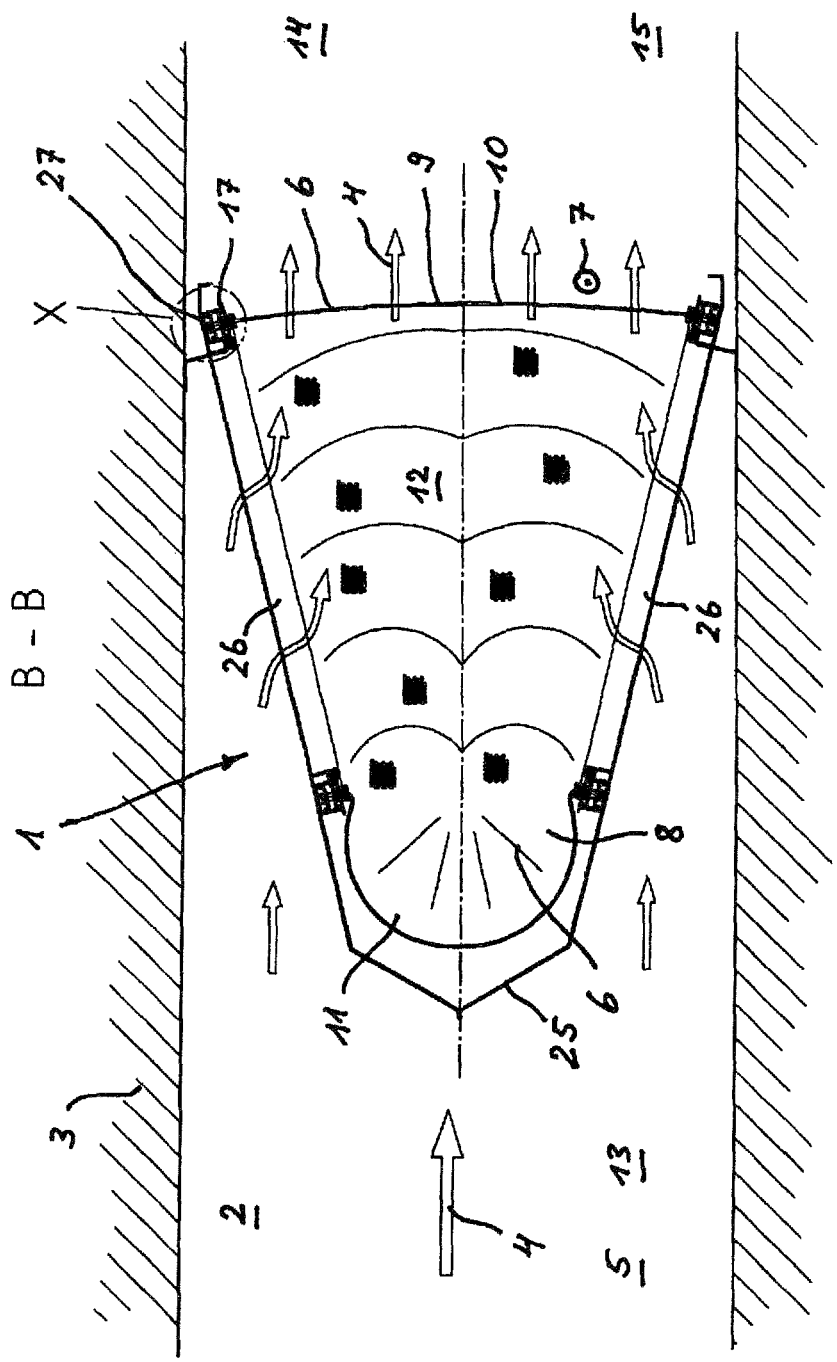
FIG. 2 is a horizontal sectional view along line B-B of FIG. 1.

FIG. 2 shows a horizontal sectional view along line B-B of the traveling screen machine of FIG. 1. The endless screen belt 6 through which the stream flows in flow direction 4 from in to out, or the active screen section 10, through which the stream flows, is installed essentially transverse to the flow direction 4 (flow direction in channel 2) of the water, with the open side, or the inlet side, of the traveling screen machine 1 facing the incoming stream. In the downstream active screen section 10, the flow direction is from the inside 12 of the endless screen belt 6 through the endless screen belt 6 to the outside 14 of the endless screen belt 6.

In this approach, the upstream compression section 11 of the endless screen belt is preferably not active as a screen, i.e. the liquid stream 5 does not flow through it, or it does not contribute to the screening effect of the traveling screen machine 1. This can be effected, for example, by giving the endless screen belt 6 a special design, where it is folded, compressed or bent transverse to its direction of movement 7 in the compression area 11. According to a preferred embodiment shown in FIG. 2, the traveling screen machine 1 comprises a deflector 25 arranged in the liquid stream 5 upstream of the compression section 11, the compression section 11 of the endless screen belt 6 being arranged in the wake of the deflector.

The deflector 25 serves to part the incoming liquid stream 5, wherein it is redirected about equally towards the left or right to circumvent the compression section 11. The traveling screen machine 1 comprises flow openings 26 between the compression section 11 and the active screen section 10 of the endless screen belt 6, through which the parted liquid stream 5 can flow into the inside 12 of the traveling screen machine 1. The flow openings 26 are arranged on either side of the traveling screen machine 1 between the deflector 25 and the active screen section 10, and the liquid stream obliquely flows through them. After flowing through the flow openings 26, the two halves of the liquid stream 5 are rejoined in the inside 12 of the traveling screen machine 1 and flow along the original flow direction of the liquid stream 5 to the active screen section 10.

The liquid stream 5 flows through the endless screen belt 6 only once resulting in an advantageously low pressure loss. A contributing factor to the low pressure loss is that the flow is only slightly redirected in the area of the flow openings 26, rather than by about 90°. Furthermore, it is advantageous that the redirection of the flow is not in the area of the active screen section 10, but at a considerable distance upstream therefrom. This prevents the formation of turbulence at the surface of the active screen section 10, which would increase flow resistance. The deflector 25 can be configured in a streamlined manner so that it does not have to withstand great forces. Since great forces do not act on the compression section 11 either, an economical advantage is achieved due to savings in structural cost.

However, the traveling screen machine 1 does not only have advantages with respect to low pressure loss, but also avoids the problem of debris carryover from the dirty water side 13 to the clean water side 15.

A further advantageous embodiment of the traveling screen machine 1 is that the active screen section 10 is only held on its downstream side by a guide means 27 extending at its both edges, so that it can curve, or bend in the flow direction 4. The guide means 27 preferably extend in the vertical direction. When the active screen section 10, or the downstream, ascending section 9 of the endless screen belt 6 is guided in a manner that enables the endless screen belt 6 to bend in flow direction 4 it is no longer required, unlike the through flow embodiments according to the prior art, to provide a supporting structure supporting the active screen section, such as U-profiles and steel girders on the downstream side of the active screen section 10 to receive the forces caused by the active screen section 10 in the liquid stream 5.

The traveling screen machine 1 can thus have a cost-effective design if the active screen section 10 is allowed to bend.

As can be clearly seen in FIG. 2, the endless screen belt 6 is folded, compressed or bent in the descending section 8 transverse to its direction of movement 7 with respect to the ascending section 9, so that the liquid stream 5 can flow past it. For this purpose, the endless screen belt 6 can perform, for example a folding, flexing or bending movement. Advantageously, the ratio of the transverse extension of the endless screen belt 6 in the active screen section 10 to the transverse extension of the endless screen belt 6 in the compression section 11 can be between 3:1 and 1.1:1, preferably between 2.5:1 and 1.5:1. These ranges ensure that sufficient space remains adjacent to the compression section 11 for the liquid stream 5 to pass without the endless screen belt 6 being excessively stressed by the folding, or compressing or bending action.

The endless screen belt 6 can be made of any suitable material. A first advantageous embodiment can be, for example, a flexible, perforated plastic belt, such as of PU or PE, which can have a Kevlar sandwich reinforcement, as the case may be. Another advantageous embodiment of an endless screen belt 6 is a woven belt, such as of metal, plastic or Kevlar. Another possible embodiment can be a link chain belt. Unlike the conventional endless screen belts of prior art traveling screen machines, comprising a number of concatenated screen panels, the endless screen belt 6 of a traveling screen machine according to the present invention preferably consists of a band material by which the screening or filtering action is effected directly without screen panels or screen panel inserts having to be arranged therein.

Figure 3:
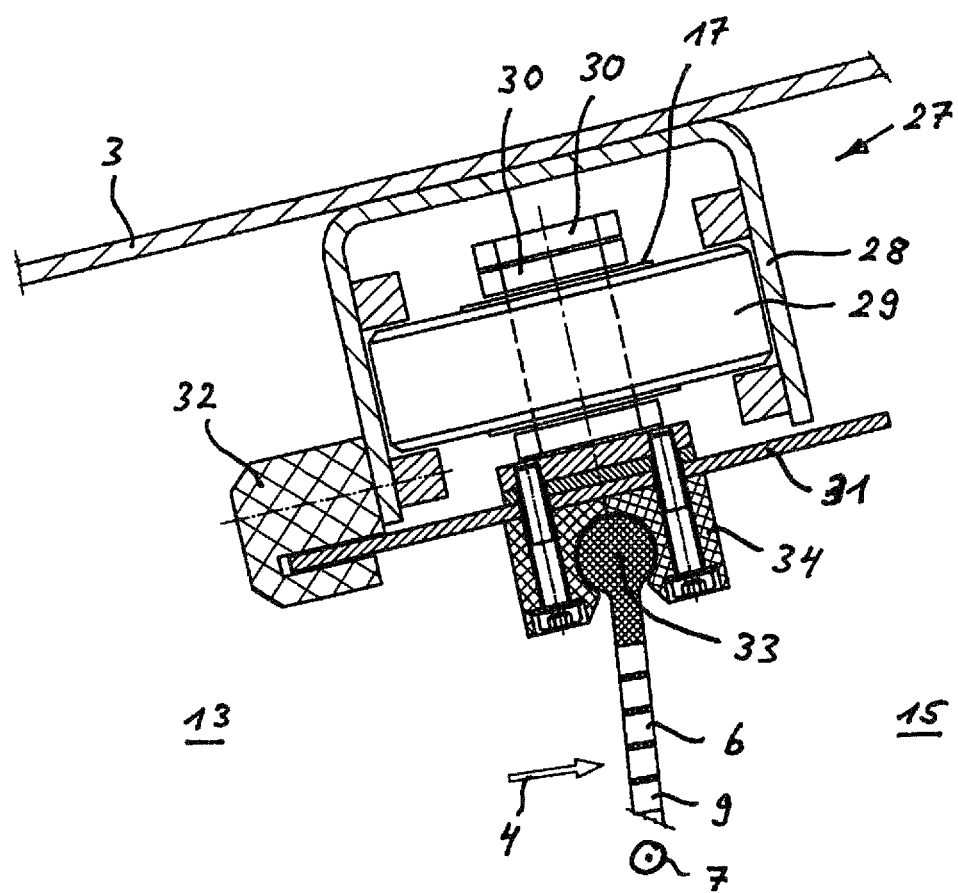
FIG. 3 is a detail X of FIG. 2.

FIG. 3, in a detail of FIG. 2, shows the guide means 27 of the active screen section 10 in structure 3. It comprises a U-section 28 for guiding the rollers 29 of a pintle chain 17 having pintles 30 and a sealing sheet 31 mounted on the pintle chain 17. The sealing sheet 31 is guided in a sealing rail 32 mounted on U-section 28. The pintle chain 17 with the sealing sheet 31 and the sealing rail 32, form the sealing means with respect to the U-section 28 of the chain guide means 27. This is to prevent liquid from the dirty water side 13 bypassing to the clean water side 15. The endless screen belt 6 has a thickening 33 on its outside, which is guided in a housing 34 in an articulated manner, which is connected to the pintle chain 17.

Figure 4:
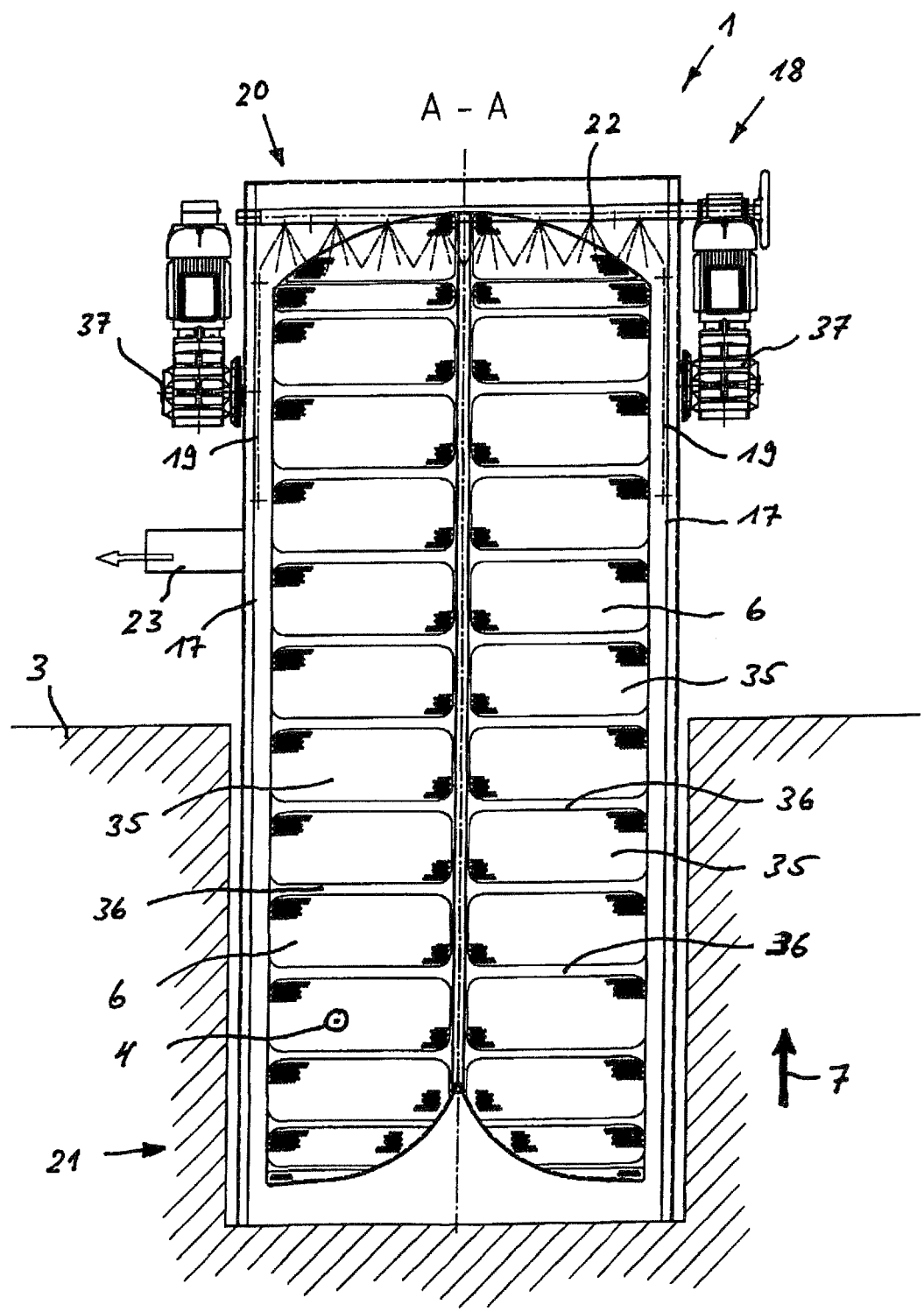
FIG. 4 is a sectional view along line A-A of FIG. 1.

FIG. 4 is a sectional view along line A-A of FIG. 1. It presents a view of the clean water side 15 of the endless screen belt 6. The endless screen belt 6 comprises perforated areas 35 through which the water flows, while the debris load is separated out. Between the perforated areas 35 in the endless screen belt 6, non-perforated webs 36 are provided, which serve to transfer the tensile force to the chains 17. The tensile force arises due to curving, or bending of the endless screen belt 6 as liquid flows through the active screen section 10.

In FIG. 4, the flow openings 26 are behind the active screen section 10 of the endless screen belt 6 and hidden by the latter in the figure, through which liquid 5 flows into the inside 12 of the traveling screen machine 1. In the area of the top redirecting means 20, the sprockets 19 arranged on the left and right and the two associated drives 37 can be seen.

FIG. 5 is a horizontal sectional view along line C-C of FIG. 1, showing these drives 37 in detail. It can be seen that the driving apparatus 18 for driving the endless screen belt 6 comprises two drive wheels in its direction of movement 7, arranged on either side of the endless screen belt 6, wherein the drive wheels are arranged at an angle with respect to each other, which is predetermined by the ratio of the transverse extension of the endless screen belt 6 in the active screen section 10 to the transverse extension of the endless screen belt 6 in the compression section 11. The two drive wheels are implemented as sprockets 19 in the present embodiment, for driving two carrier chains, one each on the left and right edge of the endless screen belt 6 to transport the endless screen belt 6 in its direction of movement 7.

To ensure synchronism of the two drives 37, or the two carrier chains, suitable steps can be taken, such as coupling by means of a cardan joint, or a frequency control with electronic synchronization of the drives 37.

The invention claimed is:

1. A traveling screen machine for mechanically separating and extracting solid components, solid bodies or solid matter from a liquid stream flowing in a sluice channel having sidewalls, wherein the sluice channel has an upstream section which is upstream from the screen machine and a downstream section which is downstream from the screen machine and a liquid flowing from said upstream section to said downstream section, the travelling screen machine comprising:
   an endless traveling screen driven by a drive apparatus for mechanically separating and extracting solids from said liquid stream, said endless traveling screen including:
      an active downstream screen section wherein said endless traveling screen is spread out, across a width of said sluice channel by a guide means and immersed in said flowing liquid;
      a compressed upstream screen section wherein said endless traveling screen is bent, folded or compressed by a guide means, such that said endless traveling screen is substantially spaced from said sidewalls of said sluice channel and immersed in said flowing liquid; and
   a drive apparatus including at least one drive motor;
   wherein liquid containing solids flows through said sluice channel, substantially past said compressed upstream screen section without passing therethrough, and through said active downstream screen section where said solids are removed from said flowing liquid.

2. The traveling screen machine of claim 1, wherein the active screen section of the endless travelling screen is aligned substantially transverse to the flow direction of the liquid stream in the sluice channel.

3. The traveling screen machine of claim 1, wherein the endless travelling screen is chain driven by the drive apparatus.

4. The traveling screen machine of claim 1, wherein the chive apparatus comprises a sprocket.

5. The traveling screen machine according to claim 1, further comprising a deflector operatively disposed in the upstream section of the liquid stream.

6. The traveling screen machine according to claim 1, further comprising flow openings operatively disposed between the compressed upstream screen section and the active downstream screen section, through which the liquid stream flows into an inside surface of the traveling screen machine.

7. The traveling screen machine according to claim 6, further comprising flow openings operatively interposed between the compressed upstream screen section and the active downstream screen section, through which an incoming, parted liquid stream at least substantially bypasses the compressed upstream screen section, and flows into the inside of the traveling screen machine and is rejoined in the inside of the traveling screen machine, to then flow to the active downstream screen section.

8. The traveling screen machine according to claim 1, wherein the active downstream screen section comprises first and second edges, and is held on its downstream side only by a guide means extending at the first and second edges so that the active downstream screen section curves or bends in a flow direction of the liquid stream.

9. The traveling screen machine according to claim 1, wherein a ratio of a transverse extension of the endless traveling screen in the active downstream screen section to a transverse extension of the endless screen belt in the compressed upstream screen section, is between 3:1 and 1.1:1.

10. The traveling screen machine according to claim 1, wherein a ratio of a transverse extension of the endless traveling screen in the active downstream screen section to a transverse extension of the endless screen belt in the compressed upstream screen section is between 2.5:1 and 1.5:1.

11. The traveling screen machine according to claim 1, wherein the endless traveling screen comprises a flexible, perforated plastic belt, a woven belt or a chain-link belt.

12. The traveling screen machine according to claim 1, wherein the drive apparatus for driving the endless traveling screen comprises two drive wheels arranged on either side of the endless traveling screen, wherein the drive wheels are arranged at an angle with respect to each other, which is determined by a ratio of a transverse extension of the endless traveling screen in the active downstream screen section to a transverse extension of the endless traveling screen in the compressed upstream screen section.

13. The traveling screen machine according to claim 1, further comprising spray nozzles or compressed air nozzles arranged on an outside of the endless traveling screen, and a debris collection trough arranged on an inside of the endless traveling screen opposite the spray nozzles or compressed air nozzles for collecting debris sprayed off the endless traveling screen.

\* \* \* \* \*